US011998502B2

(12) United States Patent
Sedic

(10) Patent No.: US 11,998,502 B2
(45) **Date of Patent: *Jun. 4, 2024**

(54) STIMULATION DEVICES AND METHODS OF USE

(71) Applicant: LELO Inc., San Jose, CA (US)

(72) Inventor: Filip Sedic, Shanghai (CN)

(73) Assignee: LELO Inc., San Jose, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 17/355,513

(22) Filed: Jun. 23, 2021

(65) Prior Publication Data

US 2021/0338521 A1 Nov. 4, 2021

Related U.S. Application Data

(63) Continuation of application No. 17/028,351, filed on Sep. 22, 2020, now Pat. No. 11,071,682, which is a (Continued)

(51) Int. Cl.

*A61H 19/00* (2006.01)
*A61H 1/00* (2006.01)
*A61H 23/02* (2006.01)

(52) U.S. Cl.

CPC ............... *A61H 19/34* (2013.01); *A61H 1/00* (2013.01); *A61H 19/00* (2013.01); *A61H 23/02* (2013.01); *A61H 2201/0111* (2013.01); *A61H 2201/0153* (2013.01); *A61H 2201/1207* (2013.01); *A61H 2201/1215* (2013.01); *A61H 2201/1409* (2013.01); *A61H 2201/169* (2013.01); *A61H 2201/5025* (2013.01); *A61H 2201/5028* (2013.01); *A61H 2201/5058* (2013.01); *A61H 2205/087* (2013.01)

(58) Field of Classification Search

CPC .......... A61H 9/00; A61H 9/005; A61H 19/34; A61H 9/0057; A61H 2201/1207; A61H 19/30; A61H 19/32

See application file for complete search history.

(56) References Cited

U.S. PATENT DOCUMENTS 5,377,701 A * 1/1995 Fang ...................... A61H 9/005
132/271
6,099,463 A 8/2000 Hockhalter
(Continued)

OTHER PUBLICATIONS

Goodvibes.com, "Womanizer Delight Rechargeable Clitoral Stimulator," goodvibes.com/s/sex-toys/p/GV13785/womanizer-delight-rechargeable-clitoral-stimulator, accessed Jun. 14, 2016.
(Continued)

*Primary Examiner* — Samuel G Gilbert
(74) *Attorney, Agent, or Firm* — Evan Feldstein

(57) ABSTRACT

Stimulation devices and methods of use are described herein. An example stimulation device configured to stimulate a portion of a body of a user comprises a housing that includes a casing and a covering. The casing includes a nozzle, a motor disposed within the casing configured to generate stimulation patterns, a drive shaft connected to the motor, a sensor configured to detect changes in the rotation of the draft shaft, a controller, and a battery. The covering covers a portion of the casing.

20 Claims, 11 Drawing Sheets

Related U.S. Application Data continuation of application No. 16/023,133, filed on Jun. 29, 2018, now Pat. No. 10,792,214.

(60) Provisional application No. 62/531,829, filed on Jul. 12, 2017.

(56) References Cited

U.S. PATENT DOCUMENTS

| | | | |
|---|---|---|---|
| 6,179,775 B1 | 1/2001 | Thompson | |
| 6,464,653 B1 | 10/2002 | Hovland et al. | |
| 7,670,280 B2 | 3/2010 | Gloth | |
| 8,579,837 B1 | 11/2013 | Makower | |
| 8,784,297 B2 | 7/2014 | Mertens et al. | |
| 8,870,746 B2 | 10/2014 | Carlson | |
| 9,011,316 B2 | 4/2015 | Mertens et al. | |
| D744,665 S | 12/2015 | Lamb et al. | |
| 10,792,214 B2 * | 10/2020 | Sedic | A61H 1/00 |
| 11,071,682 B2 * | 7/2021 | Sedic | A61H 23/02 |
| 2007/0027411 A1 * | 2/2007 | Ella | A61H 9/005 601/7 |
| 2012/0150076 A1 | 6/2012 | Clarvoe | |
| 2012/0215141 A1 | 8/2012 | Peddicord | |
| 2013/0178769 A1 | 7/2013 | Schmidt | |
| 2014/0221737 A1 | 8/2014 | Liu | |
| 2016/0213557 A1 * | 7/2016 | Lenke | A61H 23/0263 |
| 2017/0027809 A1 * | 2/2017 | Lenke | A61H 19/30 |
| 2017/0202731 A1 | 7/2017 | Godfarb | |
| 2017/0281457 A1 | 10/2017 | Witt | |
| 2018/0092799 A1 | 4/2018 | Lenke | |

OTHER PUBLICATIONS

Sextoy.com, "Original Clitoral Vibrating Pump—Pink," sextoy.com/product/SE062304/original-clitoral-vibrating-pump-pink, accessed Jun. 14, 2016.

Sextoy.com, "Vibrating Clit Suckers & Pussy Pumps for vaginal & clitoral pumping," sextoy.com/categorey/26/Vibrators/Clit-Suckers-and-Pussy-Pumps, accessed Jun. 14, 2016.

Sextoy.com, "Vibrating Clit Sucker," sextoy.com/product/CNVSR-AC859/vibrating-clit-sucker, accessed Jun. 14, 2016.

Sextoy.com, "Waterproof Silicone Clitoral Pump—Pink," sextoy.com/product/SE062370/waterproof-silicone-clitoral-pump-pink, accessed Jun. 14, 2016.

* cited by examiner

STIMULATION DEVICES AND METHODS OF USE

CROSS REFERENCE TO RELATED APPLICATIONS

This application is a continuation of Non-provisional U.S. patent application Ser. No. 17/028,351, filed Sep. 22, 2020, and a continuation of Non-provisional U.S. patent application Ser. No. 16/023,133, filed Jun. 29, 2018, which claims the benefit of U.S. Provisional Application No. 62/531,829, filed Jul. 12, 2017. The related applications are incorporated by reference into this disclosure in their entirety.

FIELD

The disclosure relates generally to the field of stimulation devices and methods of use. More particularly, the disclosure relates to stimulation devices that target erogenous zones of the human body, such as the genital area. Specific examples relate to the field of sexual stimulation devices configured to stimulate the clitoris, vaginal area, skin surrounding the clitoris and vaginal area, neck, thighs, nipples, and other erogenous zones.

BACKGROUND

Stimulation devices may include several devices designed to provide stimuli to a portion of a human body. Sexual stimulation devices are types of stimulation devices that am specifically configured to provide stimuli to erogenous zones of the body. Sexual stimulation devices may comprise, for example, personal massagers, vibrators, adult toys, and other similar devices. A variety of such devices exist, and they can provide pleasurable sensations to the body in a number of ways. A vibrator, for example, is a popular sexual stimulation device that provides a pleasurable vibratory stimulus to a portion of the body (such as, but not always, the genital area) by directly contacting the relevant portion of the body. Direct contact between the genital area and the exterior of a stimulation device such as a vibrator, however, can result in several potentially negative outcomes for a user, including reduced hygiene in the event the vibrator is not cleaned periodically, unsatisfactory sensations due to the sensitive nature of the area being stimulated, and irritated skin.

Several sexual stimulation devices exist which manipulate air and/or sound waves, whether through suction or expulsion of air from a component of a device, to stimulate an erogenous zone. The manipulation of the air and production of sound waves of various types provide a different type of stimulation than that of a more traditional sexual stimulation device. These indirect sexual stimulation devices, however, can be unreliable and cease to function when a load is placed on the device, such as when a portion of the device is firmly pressed upon the skin of a user.

Accordingly, a need for sexual stimulation devices that can stimulate the body of a user through the manipulation of air flow and/or sound waves and function to provide stimulation when pressed upon the skin of the user without irritating or reducing the hygiene of the user's body is needed.

BRIEF SUMMARY OF EXAMPLES

Various example stimulation devices and methods of use are described and illustrated herein.

An example stimulation device configured to stimulate a portion of a body of a user comprises a housing having a first end, a second end opposite the first end, a nozzle, and a silicone covering, the silicone covering disposed such that it covers a portion of the first end and a portion of the second end, the housing defining a chamber having a first opening configured to receive said portion of said body, the chamber having a chamber surface that is defined by the silicone covering, a motor disposed within the housing and configured to generate a stimulation pattern, the motor including a drive shaft disposed adjacent the chamber, the motor configured to transmit the stimulation pattern into the chamber, a sensor disposed within the housing and adjacent the motor, the sensor configured to detect output produced by the motor, a controller disposed within the housing and configured to control the motor, and a battery disposed within the housing configured to provide power to the motor, the sensor, and the controller, the battery being capable of holding a portion of its maximum charge as reserve power, the battery distributing the reserve power to the motor upon the sensor detecting decreased output from the motor.

Another example stimulation device configured to stimulate a portion of a body of a user comprises a housing having a first end, a second end opposite the first end, a nozzle defined by the first end, and a silicone covering, the silicone covering disposed such that it covers a portion of the first end and a portion of the second end, the housing defining a chamber having a first opening configured to receive said portion of said body, the nozzle having a base defining a groove disposed adjacent the chamber, the chamber having a chamber surface that is defined by the silicone covering, the chamber surface being capable of moving toward and away from the first opening when in use, a motor disposed within the housing and configured to generate a stimulation pattern, the motor including a drive shaft disposed adjacent the chamber, the motor configured to transmit the stimulation pattern into the chamber, the drive shaft having a distal end configured to engage the groove of the base of the nozzle, the stimulation pattern comprising a set of sound waves, a sensor disposed within the housing and adjacent the motor, the sensor configured to detect output produced by the motor, a controller disposed within the housing and configured to control the motor, and a battery disposed within the housing configured to provide power to the motor, the sensor, and the controller, the battery being capable of holding a portion of its maximum charge as reserve power, the battery distributing the reserve power to the motor upon the sensor detecting decreased output from the motor.

Another example stimulation device configured to stimulate a portion of a body of a user comprises a housing having a first end, a second end opposite the first end, a nozzle defined by the first end, and a silicone covering, the silicone covering disposed such that it covers a portion of the first end and a portion of the second end, the housing defining a chamber having a first opening configured to receive said portion of said body, the nozzle having a base defining a groove disposed adjacent the chamber, the chamber having a chamber surface that is entirely defined by the silicone covering, the chamber surface being capable of moving toward and away from the first opening when in use, a motor disposed within the housing and configured to generate a stimulation pattern, the motor including a drive shaft disposed adjacent the chamber, the motor configured to transmit the stimulation pattern into the chamber, the drive shaft having a distal end configured to engage the groove of the base of the nozzle, the stimulation pattern comprising a set of sound waves, a sensor disposed within the housing and adjacent the motor, the sensor configured to detect output produced by the motor, a controller disposed within the housing and configured to control the motor; and a battery disposed within the housing configured to provide power to the motor, the sensor, and the controller, the battery being capable of holding a portion of its maximum charge as reserve power, the battery distributing the reserve power to the motor upon the sensor detecting a decreased output from the motor, wherein no portion of the housing that defines chamber is removeable or replaceable.

Additional understanding of the claimed stimulation devices can be obtained by reviewing the detailed description of selected examples, below, with reference to the appended drawings.

DESCRIPTION OF EMBODIMENTS

Figure 1:
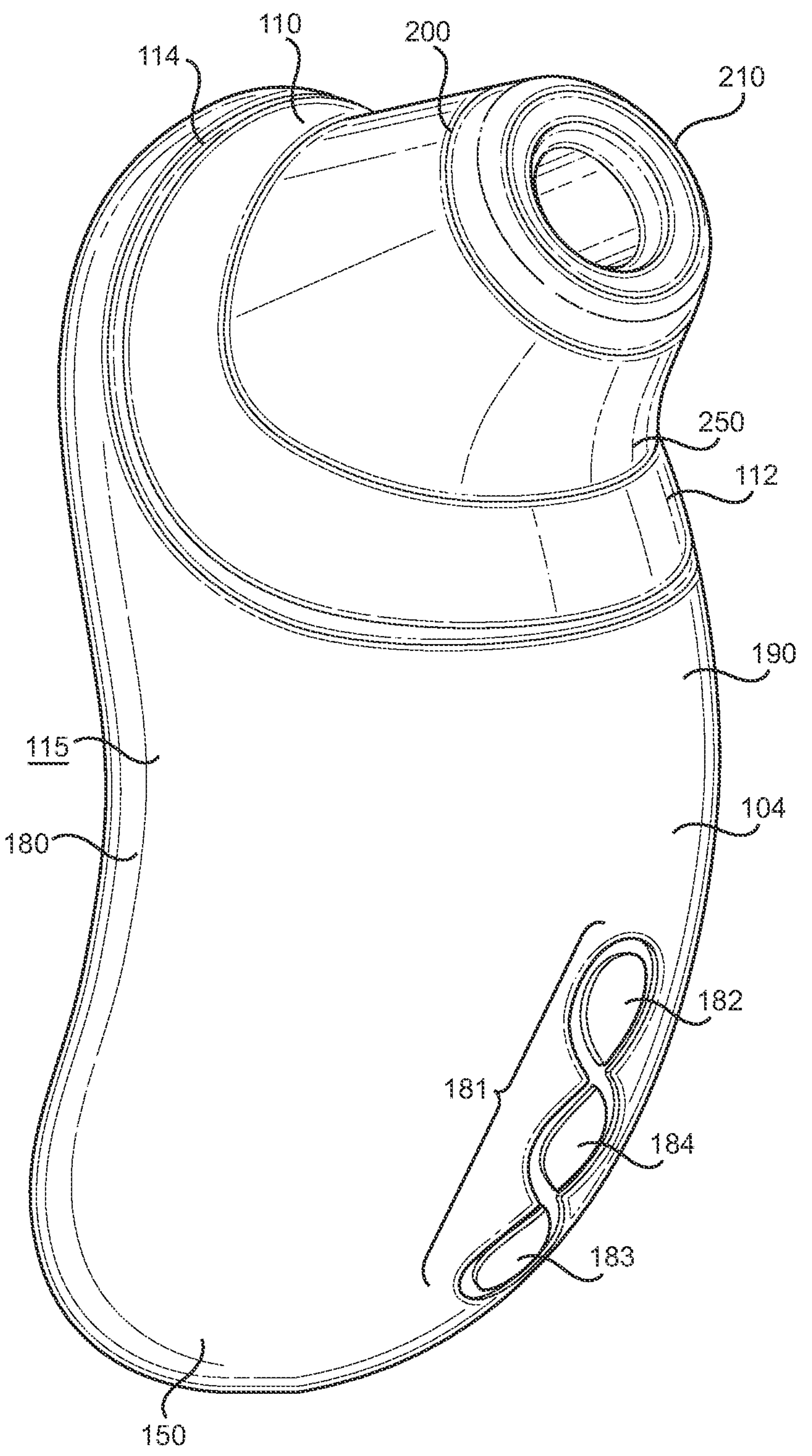
FIG. 1 is a perspective view of an example stimulation device without its covering.
Figure 2:
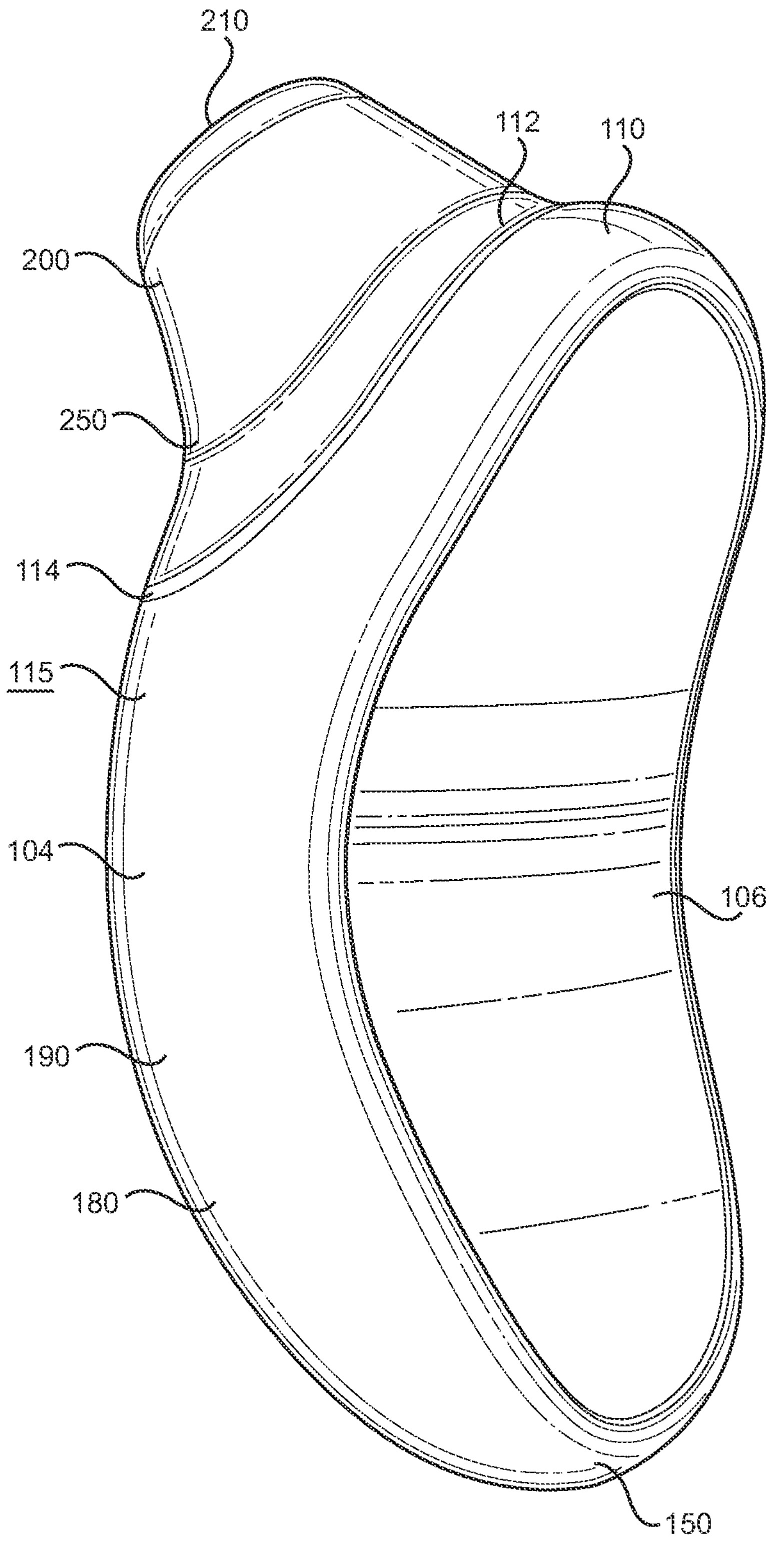
FIG. 2 is another perspective view of the stimulation device illustrated in FIG. 1.
Figure 3:
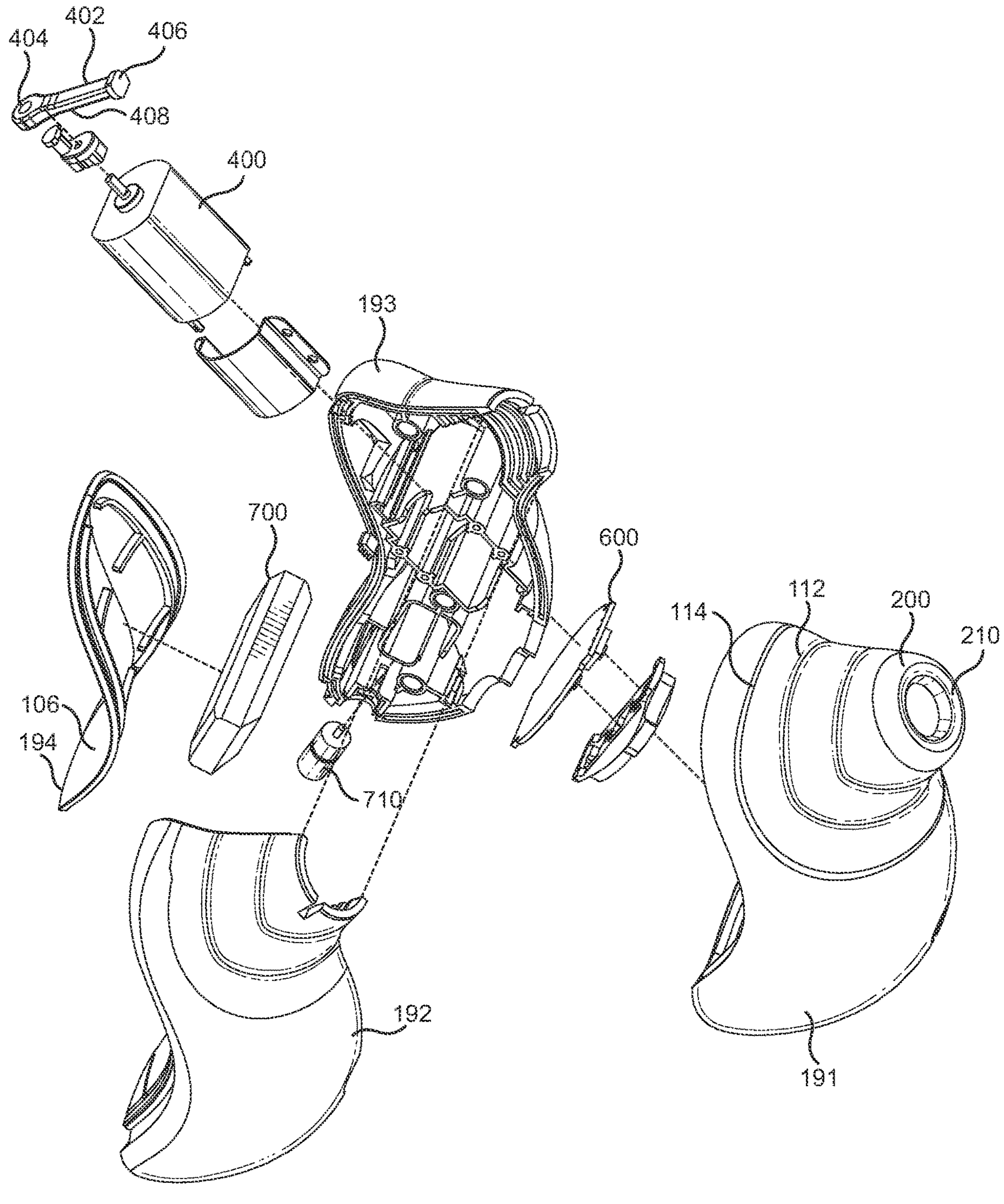
FIG. 3 is an exploded view of the stimulation device illustrated in FIG. 1.
Figure 4A:
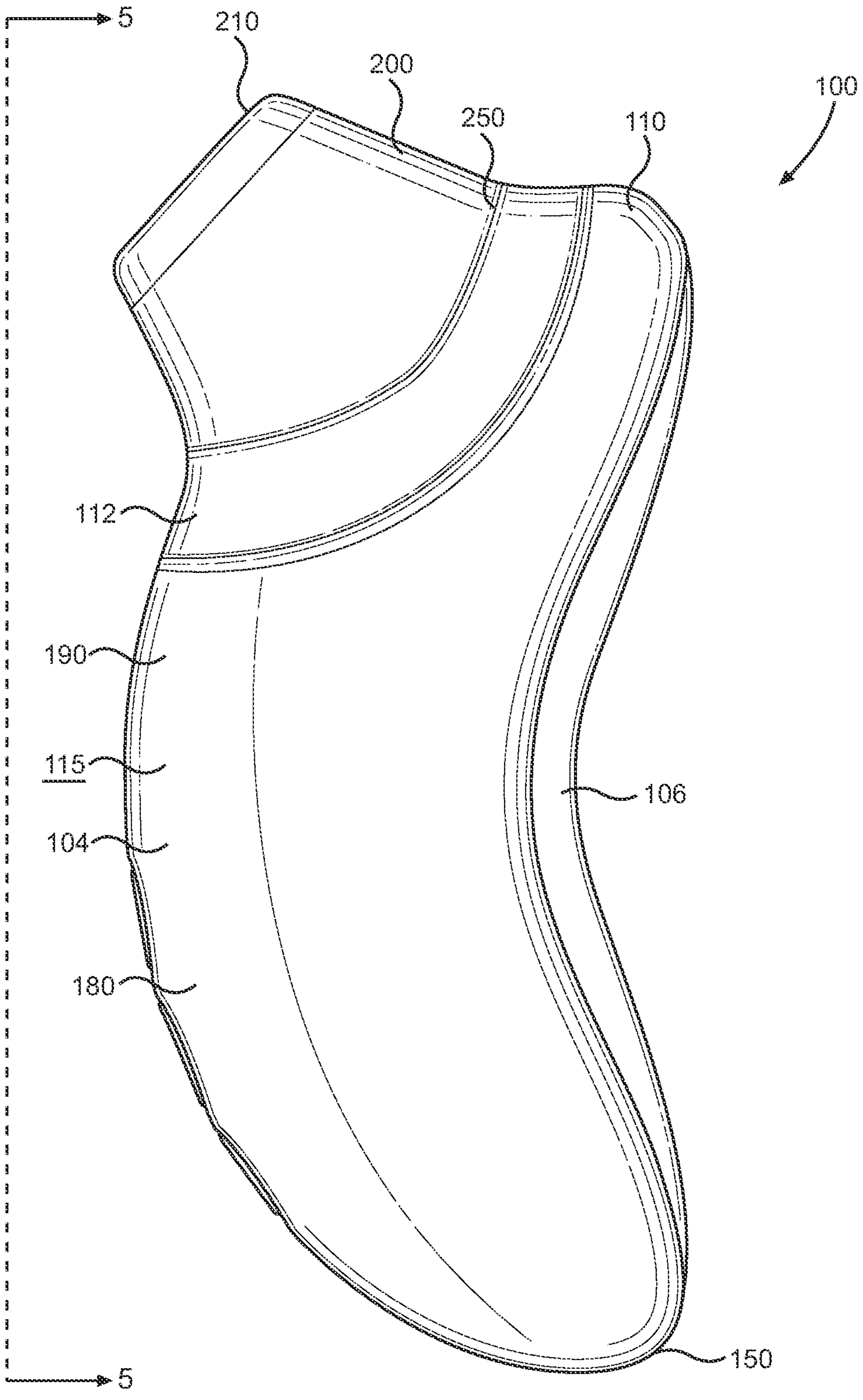
FIG. 4A is a side view of the stimulation device illustrated in FIG. 1.
Figure 4B:
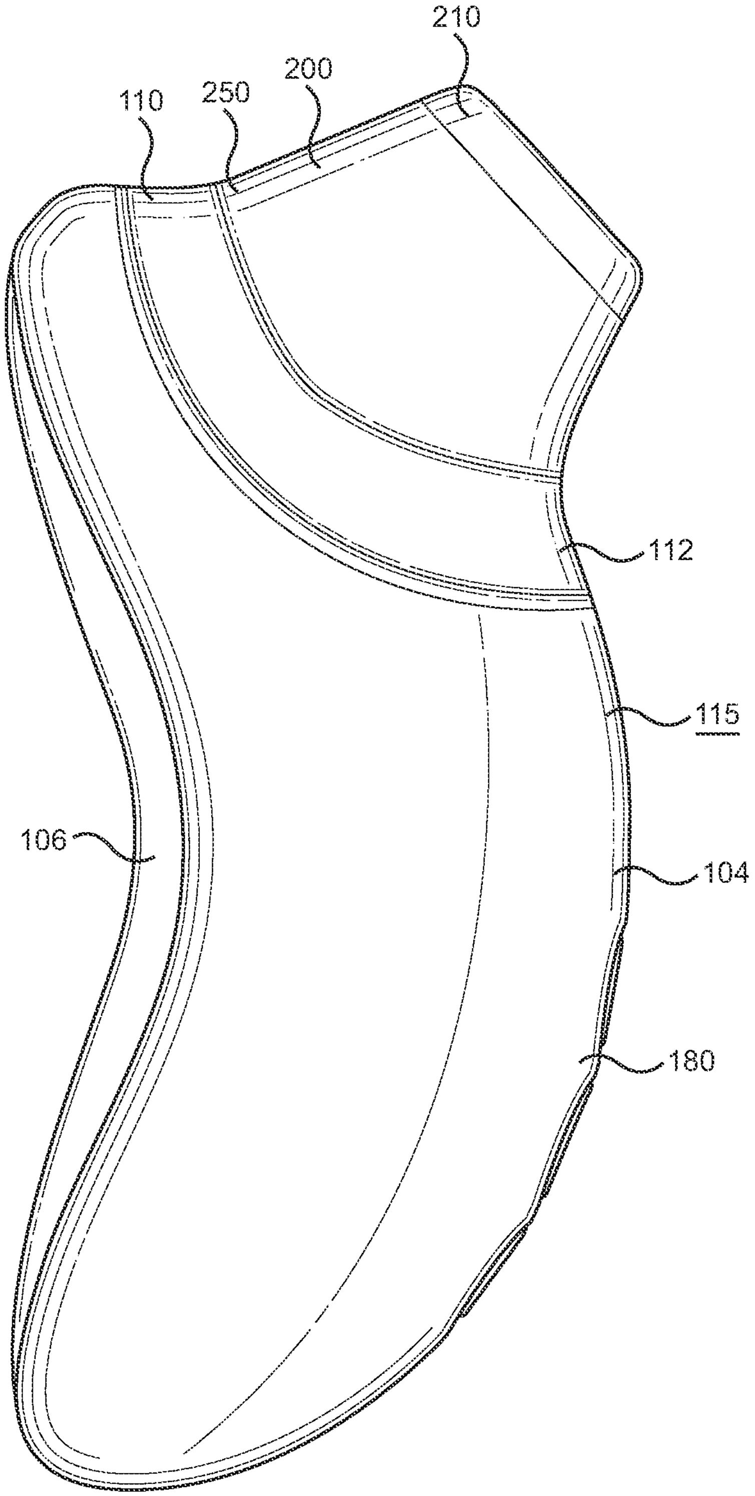
FIG. 4B is another side view of the stimulation device illustrated in FIG. 1

The following detailed description and the appended drawings describe and illustrate various example devices suitable for use as stimulation devices. The description and drawings are provided to enable one skilled in the art to make and use one or more example stimulation devices. They are not intended to limit the scope of the claims in any manner.

FIGS. 1, 2, 3, 4A, 4B, 5, 6, 7, 8, 9, and 10 illustrate an example stimulation device 100 and/or various components thereof. The stimulation device 100 comprises at least a housing 102, a motor 400, a sensor 500, a controller 600, and a battery 700.

The housing 102 is comprised of a casing 190 and a covering 199. The casing 190, houses the internal components of the stimulation device 100, such as the motor 400, the sensor 500, the controller 600, and the battery 700, as well as various other components (collectively referred to as "internal components"). The casing 190 is comprised of a first piece 191, a second piece 192, a third piece 193, and a fourth piece 194. The first piece 191 is configured such that is snugly fits between the second piece 192 and the third piece 193. The second piece 192 and third piece 193 are placed over the first piece 191 and connect mechanically to help to protect the first piece 191 and the internal components from damage. The fourth piece 194 is placed along the rear of the stimulation device 100 and attaches mechanically to the second and third pieces 192, 193 to protect the rear of the stimulation device 100. Thus, the second, third, and fourth pieces 192, 193, 194 cooperatively surround the first piece 191 and help to protect the internal components of the stimulation device 100 from physical harm. Optionally, the second piece 192, the third piece 193, and the fourth piece 194 may be securely attached to one another through additional means, such as through the use of an adhesive. Each of the first, second, third, and fourth 191, 192, 193, 194 pieces are comprised of plastic in the illustrated embodiment; however, in other embodiments, any suitable material may be used instead of plastic to comprise one or more of the pieces. A skilled artisan will be able to determine how best to size and shape the pieces of the casing according to a particular example based on various considerations, including the size, shape and number of electrical components on the interior of the device. In other embodiments, one or more of the first, second, and third pieces may be omitted. In various embodiments, the first, second, third, and fourth pieces may have any shape and size. In different embodiments, any type of mechanical, adhesive, or other type of attachment may connect one or more of the first, second, third, and fourth pieces to another of the pieces. In yet other embodiments, one or more of the first, second, third, and fourth pieces may be comprised of any material. In other embodiments, the casing may have any shape, including that of a sphere, box, remote control, bean, kidney, pyramid, tube, and banana.

Figure 9:
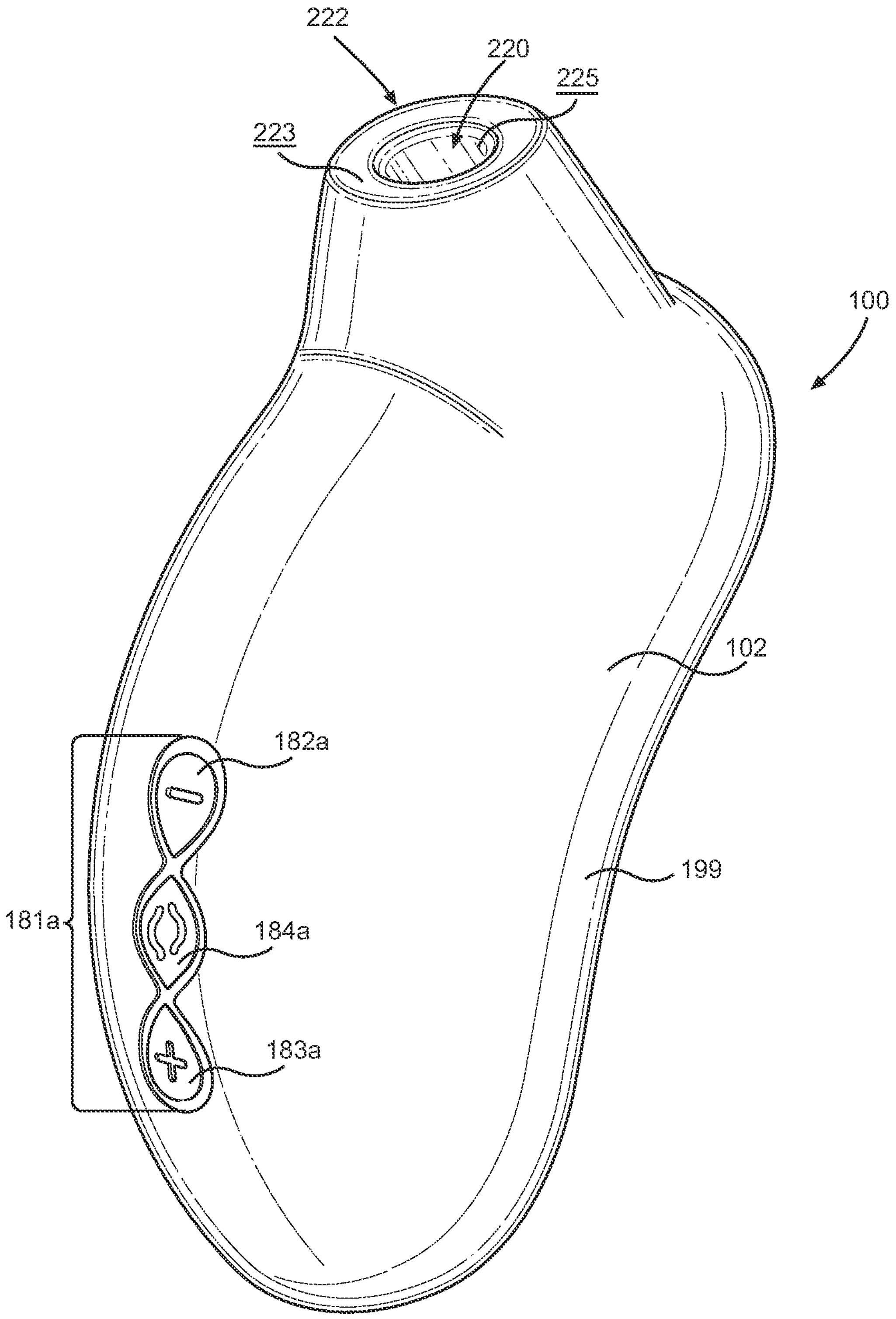
FIG. 9 is a perspective view of the stimulation device illustrated in FIG. 1 with its covering.
Figure 10:
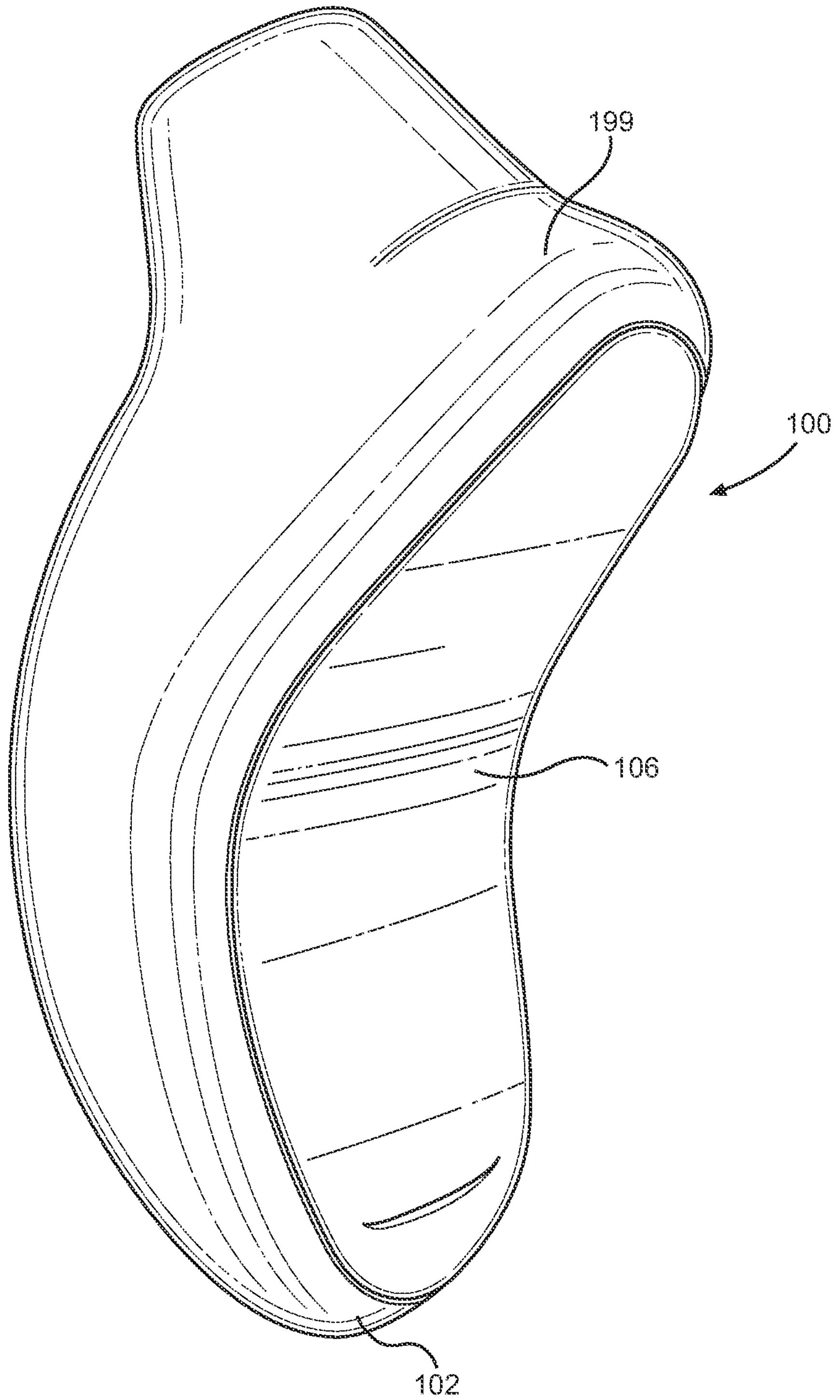
FIG. 10 is another perspective view of the stimulation device illustrated in FIG. 9.

As illustrated in FIGS. 9 and 10, the covering 199 covers a significant portion of the casing 190 (including portions of the first, second, and third, 191, 192, 193 pieces) in the illustrated embodiment. The covering 199 is, whether directly or indirectly, disposed over substantially all of the exterior surfaces of the aforementioned first, second, and third pieces 191, 192, 193 of the casing 190 and fits tightly over the same. The covering 199 provides another layer of protection for the internal components of the device. In the illustrated embodiment, the covering 199 is comprised of medical grade silicone, which helps to prevent bacteria from building up on the exterior of the stimulation device 100 and to prevent liquid from contacting the internal components. A skilled artisan will be able to select suitable materials to comprise the covering according to a particular example based on various considerations, including the size and shape of the casing and the number and type of internal components housed within the casing. In various embodiments, the covering may have one, two, three, or more than three layers. In another embodiment, the covering may only cover a portion of the device, such as the nozzle. In other embodiments, the covering may be comprised of any suitable material.

The casing 190 and covering 199 both protect the internal components of the stimulation device 100 from excessive damage, including through ordinary wear and tear (e.g., a user drops the stimulation device 100) and from liquid damage, whether via water or other types of liquid such as lotions, oils, or creams. Specifically, the covering 199 acts as an initial barrier which protects the internal components from potentially damaging liquid exposure and the casing 190 and, specifically, the four-pieced structure provides up to another two layers of protection at any particular point for the internal components from damage. Consequently, the stimulation device 100 is substantially liquid-proof and, specifically, waterproof; thus, it may be placed in water without fear of destroying the device or substantially reducing its functionality.

When assembled, the casing 190 includes a first end 110, a second end ISO substantially opposite the first end 110, and a middle portion 180 extending from the first end 110 to the second end 150. The casing 190 is ergonomic in shape and is configured to be held by the hand of a user once the covering 199 has been added to the same. The casing 102 also includes a first side 104 and a second side 106 opposite the first side 104. The stimulation device 100 generally has a curved shape, as illustrated, and is configured to be held such that the palm of a user is adjacent the second side 106 and his or her fingers are adjacent the first side 104. This shape allows a user to easily access the set of control buttons 181 disposed on the exterior of the housing 102 while holding the device with a single hand.

The first end 110 of the casing 190 includes the nozzle 200, which is disposed on the first side 104. The nozzle 200 extends away from the second side 106 and, consequently, toward the user when it is in use. The nozzle 200 is surrounded by a recessed portion 112 that is adjacent the nozzle 200 and formed by the first side 104. The recessed portion 112 is substantially annular. A substantially ring-shaped connecting portion 114 is disposed between the recessed portion 112 and the surface 115 of the first side 104.

The nozzle 200 is raised and extends away from the recessed portion 112 and includes a proximal end 210 and a distal end 250 disposed opposite the proximal end 210 and adjacent the recessed portion 112. The diameter of the proximal end 210 of the nozzle 200 is smaller than the diameter of its distal end 250. The nozzle 200 is formed by and, thus, integral with the housing 102 and is therefore not removable or replaceable.

For purposes of this application, references to the chamber 220 and its various associated components shall refer to the space into which a portion of a user is placed in order to receive stimulation. Thus, the chamber 220 exists and is shown both in figures which include the covering 199 and in those that do not.

When assembled, the nozzle 200 and covering 199 cooperatively define a chamber 220 beginning at the proximal end 210 of the nozzle and extending toward the second end 106; accordingly, the chamber 220 is defined by the housing 102. As illustrated in FIG. 9, the chamber 220 has a first opening 222 at the proximal end 210 of the nozzle 200 that is defined by an opening surface 223 that is substantially ring-shaped; consequently, the first opening 222 itself is substantially circular in shape. The first opening 222 defines a first diameter $di_1$. The nozzle 200 also defines a base 260 defined by the distal end 250 of the nozzle 200. The base 260 defines a groove 262 configured to engage the drive shaft 402 of the motor 400. The groove 262 may have any size and shape. The chamber 220 further defines second diameter $di_2$, which represents the diameter of the widest portion of the chamber 220, and a depth $de_1$ extending from the first opening 222 to the base 260. A skilled artisan will be able to determine a suitable size and shape for the first end and nozzle according to a particular example based on various considerations, including the portion of a user's body the device is configured to stimulate and the sizes and desired diameter of the first opening. In other embodiments, the first end may not include a recessed portion and/or connecting portion and, instead, the non-recessed portion of the first side may be adjacent the distal end of the nozzle. In different embodiments, the nozzle may have a diameter that increases from its distal end to its proximal end or a diameter that is constant from its distal end to its proximal end. In yet other embodiments, one or more of the opening surface, the recessed portion, and the connecting portion may be cylindrical, conical, elliptical, or have any other suitable shape. In an alternative embodiment, the housing may not include a nozzle, or the nozzle may be disposed on the distal end or the second side of the housing. In different embodiments, the nozzle may be removable and/or replaceable. In additional embodiments, the base may define zero, two, or more than two grooves. In various embodiments, suitable depths may be between about 5 millimeters ("mm") and about 50 mm, between about 15 mm and about 40 mm, and between about 20 mm and about 30 mm. In various embodiments, suitable first diameters may be between about 5 mm and about 30 mm, between about 10 mm and about 25 mm, and between about 15 mm and about 20 mm. In various embodiments, suitable second diameters may be between about 5 mm and about 30 mm, between about 10 mm and about 25 mm, and between about 15 mm and about 20 mm.

The chamber 220 is configured such that it can partially surround the portion of a user's body that shall be stimulated. For example, in the illustrated embodiment, the nozzle 200 is configured such that all or a portion of the clitoris of a user may be inserted through the first opening 222 of the proximal end 210 and into the chamber 220, where the stimulation device 100 may stimulate the clitoris, as described below. The stimulation device 100 may be configured to allow any portion of a user's body to be inserted into the chamber 220, however, including any portion of the clitoris, vagina/vaginal tissue, thigh, neck, nipples, and/or penis.

The chamber 220 is disposed such that it is simple for a user of the stimulation device 100 to clean the interior and inner surface 225 (defined by the covering 199) of the chamber 220 either through placing liquid within the chamber 220, inserting a cleaning device (such as a cleaning swab) into the chamber 220, or via some combination thereof. As noted above, the housing 102, and thus the chamber 220, is tightly sealed such that no liquids (cleaning or otherwise) will be able to pass through the inner surface 225 of the chamber 220 and into the interior of the housing 102, even during cleaning. This type of protection from water damage is absent in other devices, many of which include a removeable chamber comprised of plastic. Using a removeable chamber that does not include multiple barriers impeding liquid from entering a device often results in devices that become defective once exposed to a liquid. This is especially true in devices that have an electronic or electric component adjacent a chamber.

The middle portion 180 of the housing 102 includes a set of control buttons 181 that are configured to allow the user to interact with the controller 600, which is disposed within the housing 102. The control buttons 181 include a first button 182 configured to decrease the intensity of the stimulation produced by the motor 400, a second button 183 configured to increase the intensity of the stimulation produced by the motor 400, and a third button 184 configured to instruct the controller 600 to recall a particular stimulation pattern stored on its memory (described in greater detail below) and power on or off the device. The surface 198 of the covering 199 includes a set of markings **181*a* that correspond to and are substantially placed over the control buttons 181 and include a first marking 182*a*, a second marking 183*a*, and a third marking 184*a*. The set of markings 181*a* aid a user in activating the control buttons 181**. In other embodiments, one, two, four, or more than four buttons may comprise control buttons. In various embodiments, one or more control buttons may be illuminated while in use.

Figure 5:
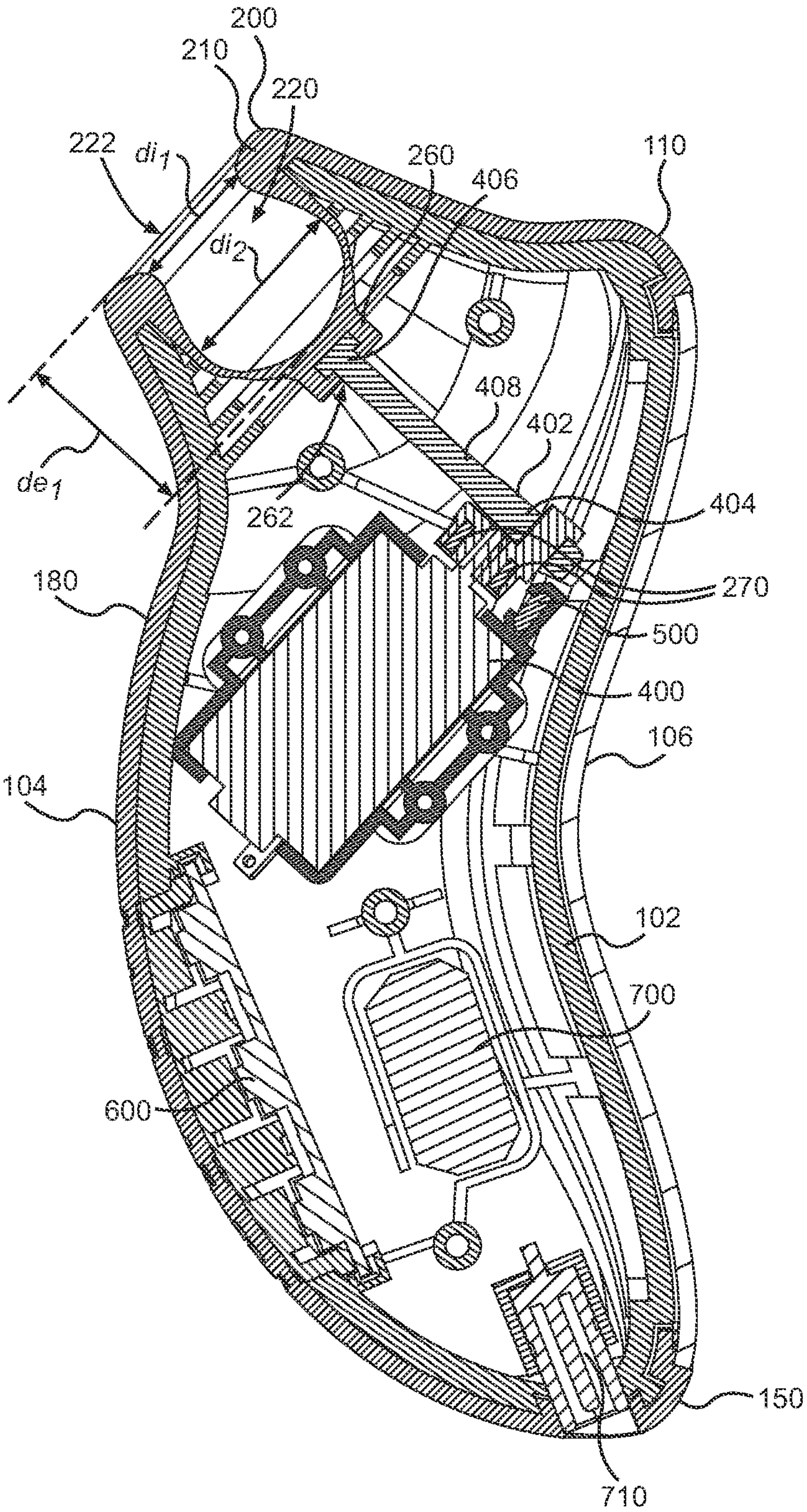
FIG. 5 is a cross-sectional view of the stimulation device illustrated in FIG. 4A, taken along line 5-5.
Figure 6:
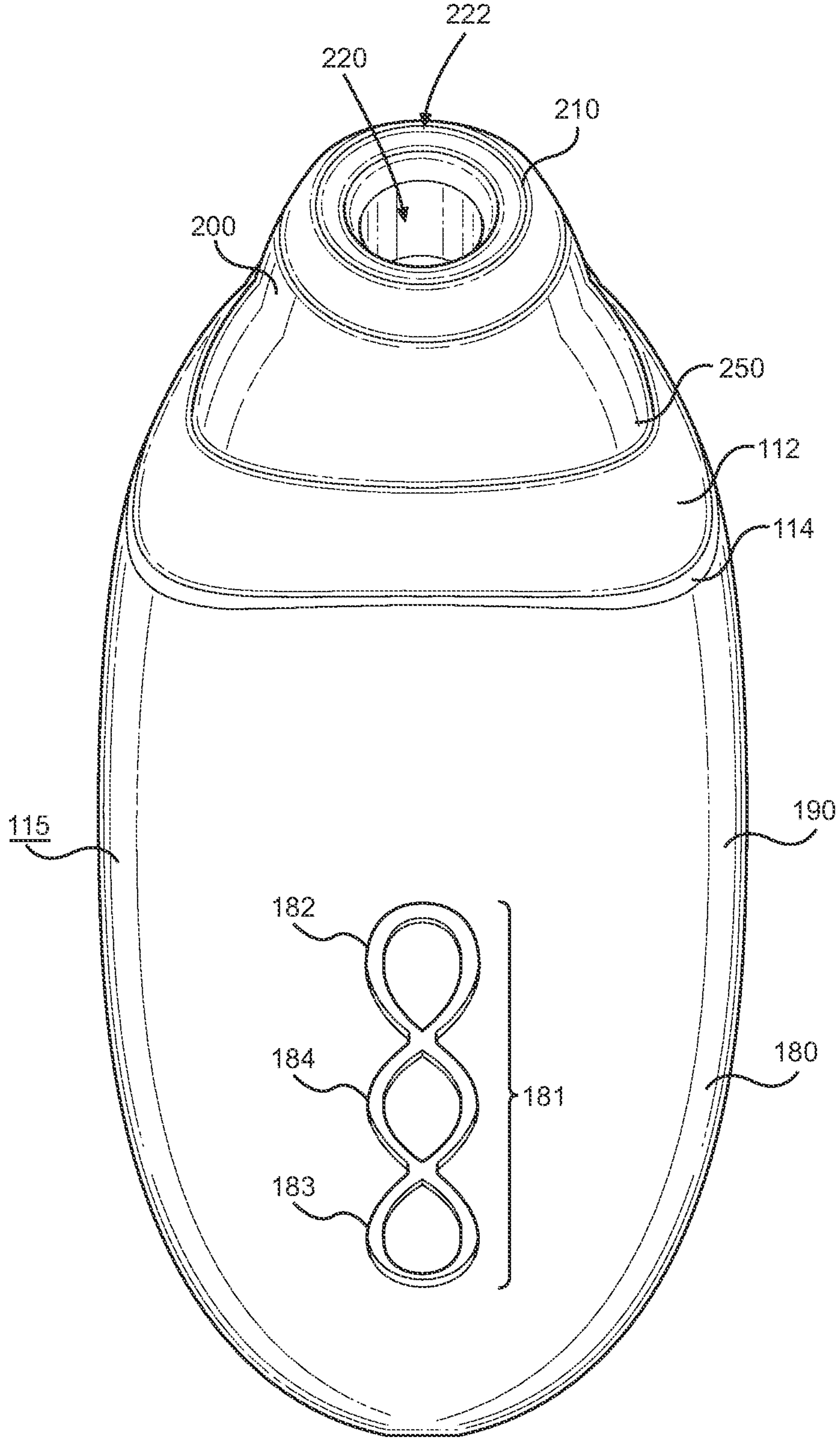
FIG. 6 is an end view of the stimulation device illustrated in FIG. 1.
Figure 7:
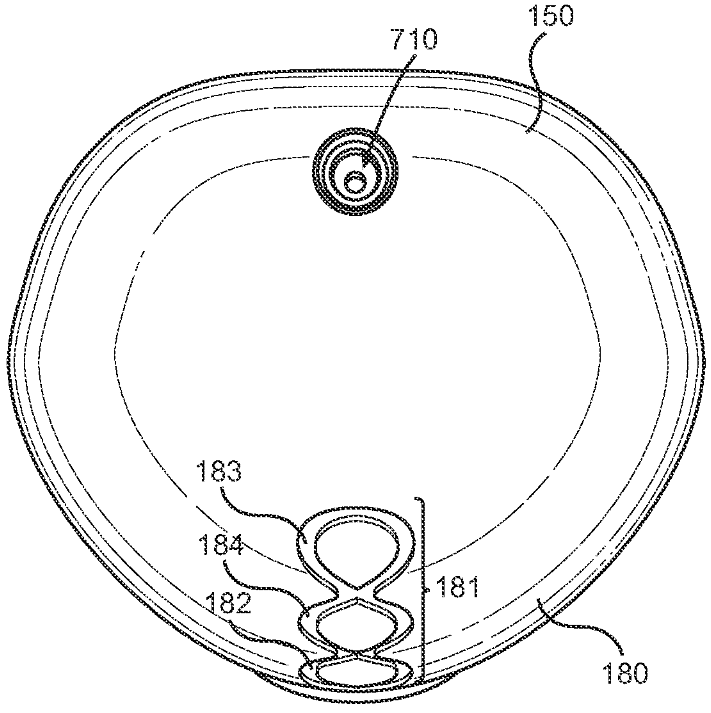
FIG. 7 is a bottom view of the stimulation device illustrated in FIG. 1.
Figure 8:
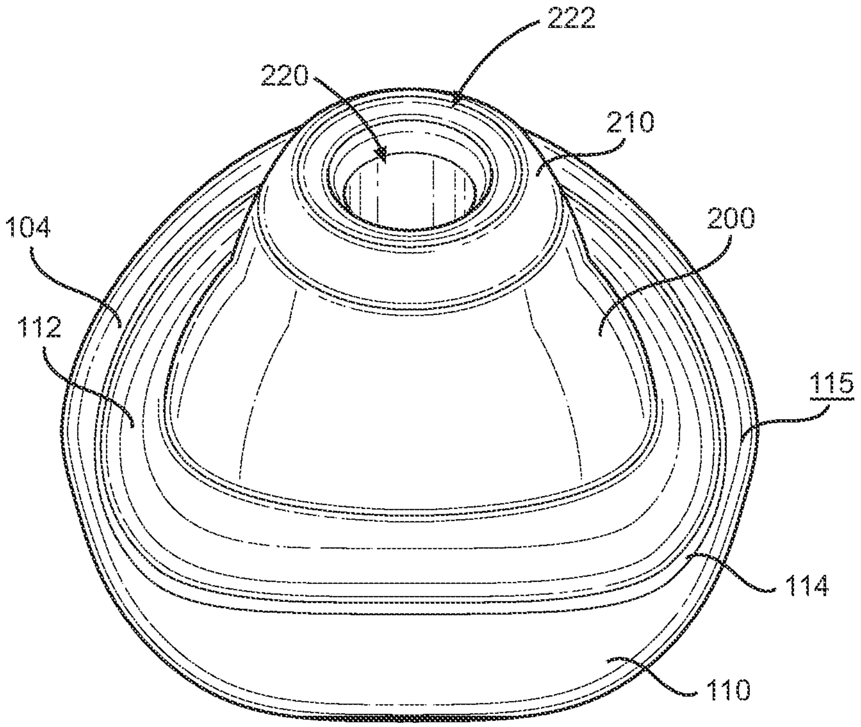
FIG. 8 is a top view of the stimulation device illustrated in FIG. 1.

The motor 400 is best illustrated in FIG. 5. The motor 400 is disposed within the housing 102 nearer to the first end 110 than the second end 150. The motor 400 includes a drive shaft 402 having a proximal end 404 and a distal end 406. The distal end 406 is enlarged relative to a middle portion 408 extending from the proximal end 404 to the distal end 406 and extends towards the inner surface 225 of the chamber 220. The distal end 406 is configured such that it snugly fits into the groove 262 defined by the base 260 of the distal end 250 of the nozzle 200. The groove 262 engages the distal end 406 and maintains it its position adjacent the base 260 when the drive shaft 402 rotates. A magnetic unit 270 is attached to the drive shaft 402. Accordingly, when the motor 400 is in operation, the movement of the drive shaft 402 produces stimulating waves that are transmitted into the chamber 220 and out of its opening 222, which comprise various stimulation patterns depending on the specific intensities and durations of the stimulating waves, that are emitted throughout the device; specifically, the stimulating waves (and, thus, stimulation patterns) are targeted to be emitted into and through the chamber 220 of the nozzle 200. In various embodiments, the magnetic unit may comprise one, two, three, or more than three individual magnets.

The motor 400 operates such that the drive shaft 402 rotates in place about its longitudinal axis (not illustrated in the Figures), which extends along the length of the drive shaft 402 through its center; these rotations generate stimulating waves, which comprise the stimulation patterns. Based on the particular pattern of rotations of the drive shaft 402, the stimulation patterns may be constant or varying; they may also comprise bursts or vary in intensity and/or duration. As described below, the controller 600 transmits a user's selection of stimulation patterns to the motor 600, which then implements such selections. A skilled artisan will be able to select a suitable motor according to a particular example based on various considerations, including the placement of the motor relative to the portion of the device configured to emit stimulation and the types of stimulation patterns that the device is designed to emit. In some embodiments, the motor may comprise an electric motor. In other embodiments, the drive shaft may rotate at any rate, including between about 1,000 revolutions per minute ("rpm") and about 5,000 rpm, between about 2000 rpm and about 4,000 rpm, and between about 2,500 and about 3,500 rpm. In other embodiments, the magnetic unit may be attached to the drive shaft through any mechanical means or through an adhesive; it may also be disposed within the drive shaft.

As noted above, the motor 400, through rotations of the drive shaft 402, produces stimulating waves that comprise stimulation patterns when the motor 400 is in operation. Depending on the particular types of stimulating waves that are emitted, the motor 400 may produce a vacuum (or partial vacuum) within the chamber 220, which produces a suction-like effect on the user when a part of the user's body is disposed within the chamber 220 or directly adjacent the opening 222 of the chamber 220. Additionally, the motor 400 is configured to produce stimulating waves that may "push" air from within the chamber 220 through and out of its opening 222, thus producing stimulation that includes the expulsion of air from the stimulation device 100. The inner surface 225 of the chamber 220 of the nozzle 200 is designed such that it can act as a diaphragm and, in some instances, similar to a speaker configured to emit audio; thus, it may be disposed slightly further from the opening 222 when a suction is produced and slightly closer to the opening 222 when air is expelled from the chamber 220, as compared to when the motor 400 is not in operation. The motor 400 may be configured to produce other stimulating waves and stimulation patterns, as well. In addition, the stimulation device 100 may be configured such that when the sound waves produced by the motor are transmitted toward the portion of the user disposed within the chamber 220, the sound waves may reflect after contacting the user, contact the inner surface 225 again, and then reverberate towards the user. This would provide added stimulation to a user that would be unpredictable, as the reverberating sound waves would not behave in a consistent manner A skilled artisan will be able to select a suitable motor according to a particular example based on various considerations, including the placement of the motor relative to the portion of the device to emit stimulation and the types of stimulation patterns that the device is designed to emit. In other embodiments, the motor may only produce stimulating waves that produce a suction-like effect within the nozzle. In different embodiments, the motor may only produce stimulating waves that produce expulsion of air from the chamber of the nozzle. In various embodiments, the inner surface of the chamber may extend between about 0 mm and about 20 mm, between about 5 mm and about 15 mm, and between about 8 mm and about 12 mm toward or away from the opening of the chamber when air is expelled out of the chamber or a suction is produced, respectively. In an alternative embodiment, the motor may be configured to vibrate the nozzle including its inner surface without suction or the expulsion of air. In various embodiments, the motor may produce suitable vibrations and/or pulsations having frequencies between about 10 Hertz (Hz) and about 150 Hz, between about 40 Hz and about 120 Hz, and about 70 Hz and about 90 Hz.

FIG. 5 best illustrates the sensor 500, which is disposed nearer the first end 110 than the second end 150 and adjacent the drive shaft 402 and motor 400. The sensor 500 is configured to detect how frequently the drive shaft 402 rotates in a given period of time by monitoring the movement of the magnetic unit 270. Any suitable sensor may be used in various embodiments, so long as the sensor can detect the position of the magnetic unit over time and transmit such information to the controller. A Hall Effect Sensor (sometimes referred to as a Hall Sensor) is a suitable example of the sensor.

When a load, such a user pressing the nozzle 200 of the device to his or her body with a strength that passes a certain threshold, is placed upon the stimulation device 100, the motor 400 slows and the drive shaft 402 (and, thus, the magnetic unit) rotates less quickly. The sensor 500 detects the lower rate of rotation of the magnetic unit 270 in a given time period, indicating that the number of rotations of the drive shaft 402 in a given time period has decreased. Upon sensing the changes to the rate of the rotation of the drive shaft 402, the sensor 500 alerts the controller 600 of the reduced rate of rotation of the drive shaft 402; the controller 600 then instructs the motor 400 to increase production and the battery 700 to provide the motor 400 additional energy to do so (described below). Alternatively, the sensor 500 can directly instruct the motor 400 to increase output in response to the load exerted on the first end 110 by the user that has slowed the drive shaft 402.

Upon such an instruction from the sensor 500 or the controller 600, the motor 400 will use reserve energy that is stored by the battery 700 to maintain the output of the motor 400. This allows the user to continue to receive, for a period of time, the same stimulation pattern that is generated when the sensor 500 does not sense any change in the rate of rotation of the drive shaft 402 due to contact with a user. Therefore, the drive shaft 402 maintains the ability to rotate at the same rate as when there is no load on the stimulation device 100 based on the sensor's 500 output for a period of time. A skilled artisan will be able to determine what type of sensor to use and where to place the sensor according to a particular example based on various considerations, including the size and shape of the motor and the type of sensor used. In different embodiments, the sensor may be disposed at any suitable portion within the housing and it may be configured to measure the rate of rotations of the drive shaft in any suitable manner. In other embodiments, the sensor may be adjacent to or within the nozzle. In various embodiments, the sensor may have any particular sensitivity level (i.e., extremely, moderately, or minimally responsive to change in stimulating waves) and may act on a delay prior to instructing the motor to increase output.

Also illustrated in FIG. 5 is the controller 600. The controller 600 activates the motor 400 and sensor 500 in response to receiving a control signal and is supplied with power by the battery 700, described in greater detail below. The controller 600, for example, can change the output of stimulating waves generated by the motor 400 by altering the rate, strength, and/or duration of rotation of the drive shaft 402. The controller 600 comprises a circuit board in the illustrated embodiment; however, it may be comprised of any suitable device and/or material in other embodiments. Suitable examples include a printed circuit board and an electrical circuit board. The controller 600 includes a memory that has the capability to store multiple pre-set stimulation patterns. For example, the controller 600 may store stimulation patterns at various intensities (e.g., low, medium, high), stimulation patterns that may comprise various bursts of stimulation, and/or stimulation patterns including periods of stimulation followed by stimulation-free periods. Moreover, the controller 600, allows a user to choose stimulation patterns and their intensities through the control buttons 181 disposed on the middle portion 180 of the housing 102, as described above. Optionally, the controller 600 may also be programmed by the user to store stimulation patterns that are particularly suitable to the user.

Additionally, in other embodiments, the controller may be controlled by an external source (not illustrated in the Figures), such as a remote control or a wireless signal emitted through one or more of a mobile phone, tablet, computer, or other similar device. The external source may provide the controller stimulation patterns that are not stored on the memory of the controller.

The battery 700 is also disposed within the housing 102 and is best illustrated in FIG. 5. It is operatively connected to the charging port 710 disposed on the second end 150 of the housing 702. The battery 700 provides power to and is electrically coupled to the motor 400, the sensor 500, and the controller 600. The battery 700 comprises a lithium-ion battery in the illustrated embodiment and is rechargeable. The battery 700 is charged through the charging port 710. A skilled artisan will be able to select a suitable battery and place it at a suitable position within the housing according to a particular example based on various considerations, including the desired strength of the motor and the size and shape of the housing. In other embodiments, the battery may comprise a lithium battery, a NiMH battery, or some other type of rechargeable battery. In an alternative embodiment, the battery may not be rechargeable and, instead, may be replaceable. In a different embodiment, the stimulation device may comprise more than one battery.

The battery 700 has the ability to hold a certain amount of energy to use upon the detection of a certain condition (hereinafter, "reserve power"). More specifically, the battery 700 is configured to maintain a certain amount of reserve power that it may distribute to the motor 400 after the sensor 500 detects a decrease in the rate of rotation of the drive shaft 402 in order to keep the motor 400 functioning during such periods when a load is placed on the stimulation device 100. A skilled artisan will be able to select a suitable amount of energy comprising reserve power according to a particular example based on various considerations, including the desired strength of the motor and the size and shape of the housing. In one embodiment, the battery may store reserve power comprising between about 1% and about 50% of the battery's total storage capacity. In another embodiment, the battery may store reserve power comprising between about 10% and about 35% of the battery's total storage capacity. In yet another embodiment, the battery may store reserve power comprising between about 15% and about 25% of the battery's total storage capacity.

In use, the user shall place the stimulation device 100 over the desired portion of the body to be stimulated. Once the stimulation device has been placed such that a portion of the user is disposed within the chamber 220 of the housing 102, the user shall select a particular stimulation pattern via the control buttons 181. Upon this selection, the controller 600 shall transmit activations signals to the motor 400, which will output the particular stimulation pattern selected through the emission of stimulating waves generated by the rotation of the drive shaft 402. If, during use, the user places a load on the stimulation device 100, such as by pressing the first opening 222 of the chamber 220 of the stimulation device 100 firmly against his or her body and, consequently, alters the rotation rate of the drive shaft 402, the sensor 500 will automatically alert the controller 600 of such a load. The controller 600 shall then instruct the battery 700 to supply additional energy (or "reserve power") to the motor 400 so that the stimulation device 100 will continue to function as desired and in such a manner as it would function without the load placed on the stimulation device 100. This supply of reserve power by the battery 700 shall continue until the user ceases to place a load on the stimulation device 100 and, instead, either removes the stimulation device 100 from all contact with the body or places it in such a manner as to not affect the rotation rate of the drive shaft 402. The battery 700 shall revert to providing power to the motor 400 via normal means upon the satisfaction of either condition provided it has sufficient power remaining to do so.

Figure 11:
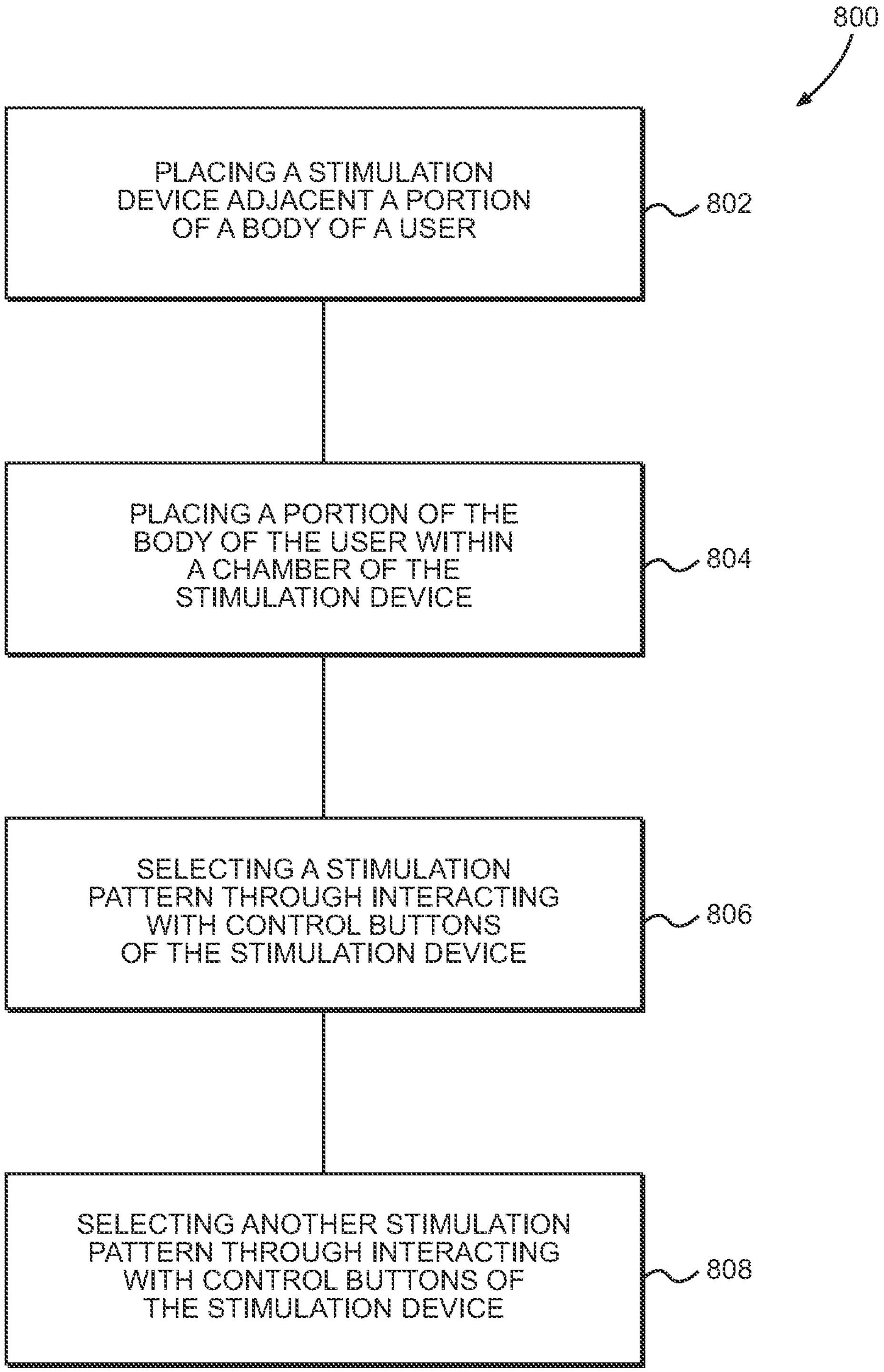
FIG. 11 is a flowchart representation of an example method of using a stimulation device.

FIG. 11 is a flowchart representation of an example method 800 of using a stimulation device.

An initial step 802 comprises placing a stimulation device, such as stimulation device 100, adjacent a portion of the body of the user to be stimulated.

Another step 804 comprises placing a portion of the body of the user, such as all or part of the clitoris, within the chamber 220 of the stimulation device 100.

Another step 806 comprises selecting a stimulation pattern through interacting with control buttons 181 of the stimulation device 100.

Optionally, another step 808 comprises selecting a second stimulation pattern through interacting with control buttons 181 of the stimulation device 100.

It is noted that the method 800 may be completed in the order illustrated and described. However, the steps may also be completed in any order.

In all examples, a stimulation device may be formed of any suitable material, including presently known and laterdeveloped materials for use in stimulation devices. A skilled artisan will be able to select an appropriate material or materials for a stimulation device based on various considerations, including, but not limited to, the desired size and shape of the device and its components and the area of a user's body which the device is designed to stimulate. Examples of suitable materials that may comprise one or more components include, but are not limited to, silicone and plastic.

Those with ordinary skill in the art will appreciate that various modifications and alternative for the described and illustrated embodiments can be developed in light of the overall teachings of the disclosure. Accordingly, the particular arrangements disclosed are intended to be illustrative only and not limiting as to the scope of the invention, which is to be given the full breadth of the appended claims and all equivalents thereof.

What is claimed is:

1. A stimulation device configured to stimulate a portion of a body of a user, comprising:
- a housing having a first end, a second end opposite the first end, a nozzle, and a silicone covering, the silicone covering disposed such that it covers a portion of the first end and a portion of the second end, the housing defining a chamber having a first opening configured to receive said portion of said body, the chamber having a chamber surface that is defined by the silicone covering;
- a motor disposed within the housing and configured to generate a stimulation pattern, the motor configured to transmit the stimulation pattern into the chamber;
- a controller disposed within the housing and configured to control the motor; and
- a battery disposed within the housing configured to provide power to the motor and the controller.

2. The stimulation device of claim 1, wherein the silicone covering comprises a single piece.

3. The stimulation device of claim 2, wherein the chamber surface can extend between one and twenty millimeters towards or away from the first opening when the motor is activated.

4. The stimulation device of claim 1, wherein the controller contains pre-set stimulation patterns that may be communicated to the motor.

5. The stimulation device of claim 4, wherein the user interacts with the controller to choose stimulation patterns through a set of control buttons.

6. The stimulation device of claim 5, wherein the housing is waterproof.

7. The stimulation device of claim 6, wherein the chamber comprises a proximal end and a middle portion; and
- wherein a diameter of the middle portion is greater than a diameter of the proximal end.

8. The stimulation device of claim 7, wherein the housing is comprised of a casing; and
- wherein the casing comprises at least a first piece, a second piece, a third piece, and a fourth piece.

9. The stimulation device of claim 8, wherein the first piece, the second piece, the third piece, and the fourth piece are comprised of plastic.

10. The stimulation device of claim 9, wherein the covering is disposed adjacent the first piece, the second piece, and the third piece.

11. The stimulation device of claim 10, wherein the housing is curved along its length and forms an ergonomic shape.

12. A stimulation device configured to stimulate a portion of a body of a user, comprising:
- a housing having a first end, a second end opposite the first end, a nozzle defined by the first end, and a silicone covering, the silicone covering disposed such that it covers a portion of the first end and a portion of the second end, the housing defining a chamber having a first opening configured to receive said portion of said body, the nozzle having a base defining a groove disposed adjacent the chamber, the chamber having a chamber surface that is defined by the silicone covering, the chamber surface being capable of moving toward and away from the first opening when in use;
- a motor disposed within the housing and configured to generate a stimulation pattern, the motor configured to transmit the stimulation pattern into the chamber;
- a controller disposed within the housing and configured to control the motor; and
- a battery disposed within the housing configured to provide power to the motor and the controller.

13. The stimulation device of claim 12, wherein no portion of the housing that defines the chamber is removeable or replaceable.

14. The stimulation device of claim 13, wherein no portion of the silicone covering is removeable or replaceable.

15. The stimulation device of claim 12, wherein the first opening has a first diameter of between five millimeters and thirty millimeters.

16. The stimulation device of claim 15, wherein the chamber defines a second diameter at the widest portion of the chamber; and
- wherein a second diameter is between five millimeters and thirty millimeters.

17. The stimulation device of claim 16, wherein the chamber defines a depth extending from the first opening to the base of the nozzle; and
- wherein the depth is between five millimeters and fifty millimeters.

18. The stimulation device of claim 12, wherein the motor comprises a drive shaft.

19. The stimulation device of claim 12, wherein the chamber surface can extend between one and twenty millimeters towards or away from the first opening when the motor is activated.

20. A stimulation device configured to stimulate a portion of a body of a user, comprising:
- a housing having a first end, a second end opposite the first end, a nozzle defined by the first end, and a silicone covering, the silicone covering disposed such that it covers a portion of the first end and a portion of the second end, the housing defining a chamber having a first opening configured to receive said portion of said body, the nozzle having a base defining a groove disposed adjacent the chamber, the chamber having a chamber surface that is entirely defined by the silicone covering, the chamber surface being capable of moving toward and away from the first opening when in use;
- a motor disposed within the housing and configured to generate a stimulation pattern, the motor configured to transmit the stimulation pattern into the chamber;
- a controller disposed within the housing and configured to control the motor; and
- a battery disposed within the housing configured to provide power to the motor and the controller.

* * * * *